(12) United States Patent
Seneff

(10) Patent No.: US 8,888,455 B2
(45) Date of Patent: Nov. 18, 2014

(54) GAS TURBINE ENGINE AND BLADE FOR GAS TURBINE ENGINE

(75) Inventor: Richard Lex Seneff, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 900 days.

(21) Appl. No.: 12/943,618

(22) Filed: Nov. 10, 2010

(65) Prior Publication Data

US 2012/0114495 A1    May 10, 2012

(51) Int. Cl.
*F01D 5/08* (2006.01)
*F01D 5/18* (2006.01)
*F01D 25/12* (2006.01)
*F01D 5/14* (2006.01)

(52) U.S. Cl.
CPC ............... *F01D 5/081* (2013.01); *F01D 5/147* (2013.01); *F01D 25/12* (2013.01); *F05D 2250/232* (2013.01); *F05D 2260/36* (2013.01); *Y02T 50/676* (2013.01)
USPC ........................................ 416/96 R; 416/248

(58) Field of Classification Search
CPC ......... F01D 5/081; F01D 5/147; F01D 25/12; F01D 2250/232; F01D 2260/36; Y02T 50/676
USPC .................. 416/95, 96 R, 97 R, 96 A, 248, 92
See application file for complete search history.

(56) References Cited

U.S. PATENT DOCUMENTS

| | | | | |
|---|---|---|---|---|
| 2,906,494 A | * | 9/1959 | McCarty et al. | 416/96 R |
| 2,977,090 A | * | 3/1961 | McCarty et al. | 416/96 R |
| 3,365,093 A | * | 1/1968 | Malenke | 220/235 |
| 3,370,830 A | * | 2/1968 | Harper et al. | 416/95 |
| 3,706,508 A | * | 12/1972 | Moskowitz et al. | 415/115 |
| 3,846,041 A | * | 11/1974 | Albani | 416/97 R |
| 3,902,820 A | | 9/1975 | Amos | |
| 4,257,734 A | * | 3/1981 | Guy et al. | 415/115 |
| 4,672,727 A | | 6/1987 | Field | |
| 4,786,233 A | | 11/1988 | Shizuya et al. | |
| 5,022,817 A | * | 6/1991 | O'Halloran | 415/115 |
| 6,176,677 B1 | * | 1/2001 | Chevrefils et al. | 416/96 R |
| 6,193,465 B1 | * | 2/2001 | Liotta et al. | 416/96 A |
| 6,481,967 B2 | | 11/2002 | Tomita et al. | |

(Continued)

FOREIGN PATENT DOCUMENTS

| | | |
|---|---|---|
| EP | 2 003 291 A1 | 12/2008 |
| GB | 2 354 290 A | 3/2001 |

(Continued)

OTHER PUBLICATIONS

United Kingdom Search Report, GB1119453.7, Rolls-Royce Corporation, Feb. 14, 2012.

(Continued)

*Primary Examiner* — Nathaniel Wiehe
*Assistant Examiner* — Joshua R Beebe
(74) *Attorney, Agent, or Firm* — Krieg DeVault LLP

(57) ABSTRACT

One embodiment of the present invention is a unique gas turbine engine blade. Another embodiment is a unique gas turbine engine. Other embodiments include apparatuses, systems, devices, hardware, methods, and combinations for gas turbine engines and blades. Further embodiments, forms, features, aspects, benefits, and advantages of the present application will become apparent from the description and figures provided herewith.

17 Claims, 3 Drawing Sheets

(56) References Cited

U.S. PATENT DOCUMENTS

| | | | |
|---|---|---|---|
| 6,485,255 B1 * | 11/2002 | Care et al. | 415/12 |
| 6,984,101 B2 * | 1/2006 | Schiavo, Jr. | 415/115 |
| 7,029,236 B2 * | 4/2006 | Marushima et al. | 416/96 A |
| 7,077,622 B2 * | 7/2006 | Ehrhard et al. | 415/9 |
| 7,137,782 B2 | 11/2006 | Eastman et al. | |
| 7,458,778 B1 | 12/2008 | Liang | |
| 7,572,102 B1 | 8/2009 | Liang | |
| 7,674,093 B2 | 3/2010 | Lee et al. | |
| 2004/0265129 A1 | 12/2004 | Pabion et al. | |
| 2006/0257256 A1 * | 11/2006 | Eastman et al. | 416/96 R |
| 2007/0274831 A1 * | 11/2007 | Beck et al. | 416/97 R |
| 2009/0178259 A1 * | 7/2009 | Tisenchek et al. | 29/23.51 |
| 2009/0226327 A1 * | 9/2009 | Little et al. | 416/96 A |
| 2009/0246006 A1 | 10/2009 | Dalton et al. | |
| 2010/0054915 A1 * | 3/2010 | Devore et al. | 415/116 |

FOREIGN PATENT DOCUMENTS

| | | | | |
|---|---|---|---|---|
| WO | WO 00/71855 A1 | 11/2000 | | |
| WO | WO 2005/103451 A1 | 11/2005 | | |
| WO | WO 2008058827 A1 * | 5/2008 | | F01D 5/18 |
| WO | WO2008/151900 A2 * | 12/2008 | | F01D 5/18 |

OTHER PUBLICATIONS

Machine Translation of WO 2005/103451 (A1).

* cited by examiner

GAS TURBINE ENGINE AND BLADE FOR GAS TURBINE ENGINE

FIELD OF THE INVENTION

The present invention relates to gas turbine engines, and more particularly to gas turbine engine blades.

BACKGROUND

Gas turbine engine blades that include internal passages sought to be closed off remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine blade. Another embodiment is a unique gas turbine engine. Other embodiments include apparatuses, systems, devices, hardware, methods, and combinations for gas turbine engines and blades. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
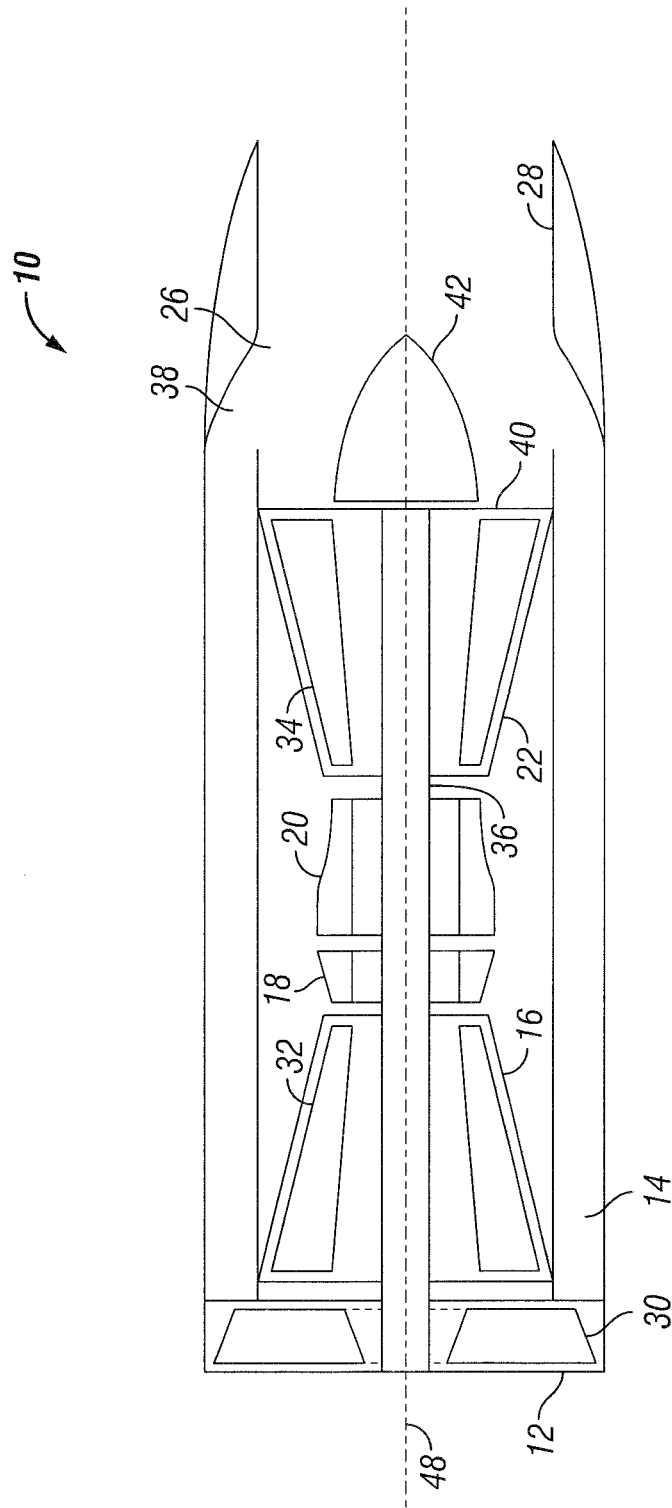
FIG. 1 schematically illustrates a non-limiting example of some aspects of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, a non-limiting example of some aspects of a gas turbine engine 10 in accordance with an embodiment of the present invention is schematically depicted. In one form, gas turbine engine 10 is an aircraft propulsion power plant. In other embodiments, gas turbine engine 10 may be a land-based or marine engine. In one form, gas turbine engine 10 is a multi-spool turbofan engine. In other embodiments, gas turbine engine 10 may take other forms, and may be, for example, a turboshaft engine, a turbojet engine, a turboprop engine, or a combined cycle engine having a single spool or multiple spools.

As a turbofan engine, gas turbine engine 10 includes a fan system 12, a bypass duct 14, a compressor 16, a diffuser 18, a combustor 20, a turbine 22, a discharge duct 26 and a nozzle system 28. Bypass duct 14 and compressor 16 are in fluid communication with fan system 12. Diffuser 18 is in fluid communication with compressor 16. Combustor 20 is fluidly disposed between compressor 16 and turbine 22. In one form, combustor 20 includes a combustion liner (not shown) that contains a continuous combustion process. In other embodiments, combustor 20 may take other forms, and may be, for example and without limitation, a wave rotor combustion system, a rotary valve combustion system or a slinger combustion system, and may employ deflagration and/or detonation combustion processes.

Fan system 12 includes a fan rotor system 30. In various embodiments, fan rotor system 30 includes one or more rotors (not shown) that are powered by turbine 22. Bypass duct 14 is operative to transmit a bypass flow generated by fan system 12 to nozzle 28. Compressor 16 includes a compressor rotor system 32. In various embodiments, compressor rotor system 32 includes one or more rotors (not shown) that are powered by turbine 22. Each compressor rotor includes a plurality of rows of compressor blades (not shown) that are alternatingly interspersed with rows of compressor vanes (not shown). Turbine 22 includes a turbine rotor system 34. In various embodiments, turbine rotor system 34 includes one or more rotors (not shown) operative to drive fan rotor system 30 and compressor rotor system 32. Each turbine rotor includes a plurality of turbine blades (not shown) that are alternatingly interspersed with rows of turbine vanes (not shown).

Turbine rotor system 34 is drivingly coupled to compressor rotor system 32 and fan rotor system 30 via a shafting system 36. In various embodiments, shafting system 36 includes a plurality of shafts that may rotate at the same or different speeds and directions. In some embodiments, only a single shaft may be employed. Turbine 22 is operative to discharge an engine 10 core flow to nozzle 28. In one form, fan rotor system 30, compressor rotor system 32, turbine rotor system 34 and shafting system 36 rotate about an engine centerline 48. In other embodiments, all or parts of fan rotor system 30, compressor rotor system 32, turbine rotor system 34 and shafting system 36 may rotate about one or more other axes of rotation in addition to or in place of engine centerline 48.

Discharge duct 26 extends between a discharge portion 40 of turbine 22 and engine nozzle 28. Discharge duct 26 is operative to direct bypass flow and core flow from a bypass duct discharge portion 38 and turbine discharge portion 40, respectively, into nozzle system 28. In some embodiments, discharge duct 26 may be considered a part of nozzle 28. Nozzle 28 is in fluid communication with fan system 12 and turbine 22. Nozzle 28 is operative to receive the bypass flow from fan system 12 via bypass duct 14, and to receive the core flow from turbine 22, and to discharge both as an engine exhaust flow, e.g., a thrust-producing flow. In other embodiments, other nozzle arrangements may be employed, including separate nozzles for each of the core flow and the bypass flow.

During the operation of gas turbine engine 10, air is drawn into the inlet of fan 12 and pressurized by fan 12. Some of the air pressurized by fan 12 is directed into compressor 16 as core flow, and some of the pressurized air is directed into bypass duct 14 as bypass flow, and is discharged into nozzle 28 via discharge duct 26. Compressor 16 further pressurizes the portion of the air received therein from fan 12, which is then discharged into diffuser 18. Diffuser 18 reduces the velocity of the pressurized air, and directs the diffused core airflow into combustor 20. Fuel is mixed with the pressurized air in combustor 20, which is then combusted. The hot gases exiting combustor 20 are directed into turbine 22, which extracts energy in the form of mechanical shaft power sufficient to drive fan system 12 and compressor 16 via shafting system 36. The core flow exiting turbine 22 is directed along an engine tail cone 42 and into discharge duct 26, along with the bypass flow from bypass duct 14. Discharge duct 26 is configured to receive the bypass flow and the core flow, and to discharge both as an engine exhaust flow, e.g., for providing thrust, such as for aircraft propulsion.

Compressor rotor system 32 includes a plurality of blades employed to add energy to the gases prior to combustion. Turbine rotor system 34 includes a plurality of blades employed to extract energy from the high temperature high pressure gases received from combustion 20. It is desirable to maintain the temperature of the blades within certain temperature limits, e.g., based on the materials and coatings employed in the blades and vanes.

In order to control the temperature of the blades, e.g., turbine blades, and in some cases compressor blades, the blades may include cored passages for injecting cooling air into the blades and for distributing the cooling air to desired locations on the blades. It is desirable to close one or more of the core printouts and/or provide one or more orifices to meter or control the rate of flow of the cooling air into and/or out of the blade. Core printouts may be closed or fitted with flow control orifices by attaching a plug, plate and/or other structure by use of one or more material joining processes that secure the plug, plate and/or other structure to the blade. Such material joining processes include, for example and without limitation, welding, brazing, diffusion bonding or other material fusing processes, as well as other bonding processes, including the use of chemical bond materials or other processes such as staking.

However, there are problems associated with such material joining processes. For example, some such material joining processes are typically controlled processes that may yield undesirable rejection rates, and may also induce undesirable stress concentrations and/or alter local material properties, e.g., resulting from localized heating, surface preparation, etc., and/or may result in damage to blade surfaces adjacent the core printouts, which may affect the life of the blade. In addition, blade servicing, including blade cleaning, typically requires removal and replacement of the plug, plate and/or other structure. Such material joining processes may also limit the number of times the blade may be successfully serviced. Further, such material joining processes may require substantial amounts of processing time, which may lead to higher blade acquisition and service costs. Some embodiments of the present invention provide for closure of one or more of the core printouts without the use of such material joining processes. In addition, some embodiments of the present invention provide one or more orifices to meter or control the rate of flow of the cooling air into and/or out of the blade, without the use of such material joining processes.

Figure 2:
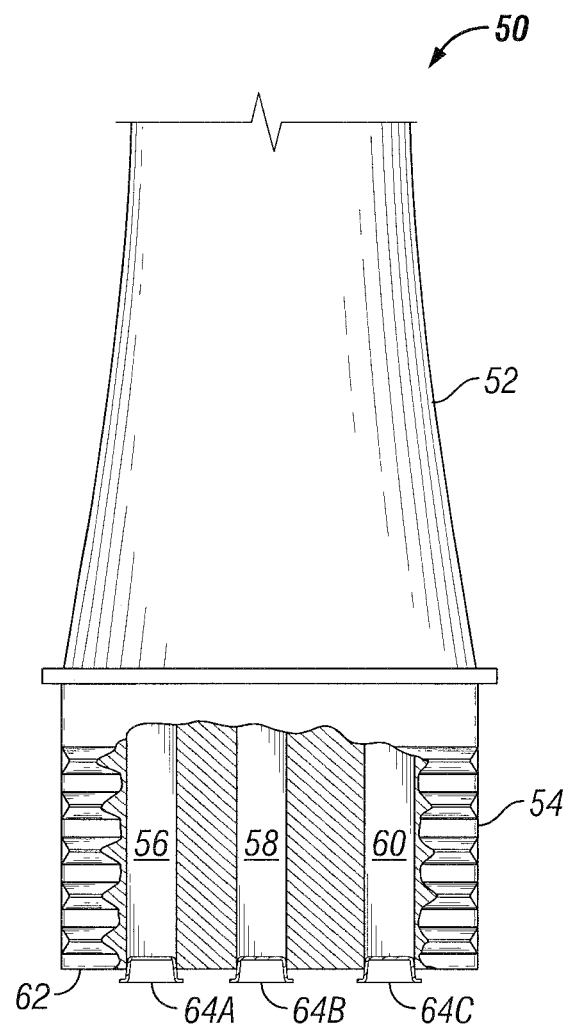
FIG. 2 schematically illustrates a non-limiting example of some aspects of a gas turbine engine blade in accordance with an embodiment of the present invention.

For example, referring to FIG. 2, a non-limiting example of some aspects of a blade 50 in accordance with an embodiment of the present invention is illustrated. In one form, blade 50 is a turbine blade. In other embodiments, blade 50 may be a compressor blade. In one form, blade 50 includes an airfoil 52 and an attachment 54 affixed to airfoil 52. In one form, attachment 54 is formed integrally with airfoil 52. In other embodiments, attachment 54 may be formed otherwise and affixed to airfoil 52. In various embodiments, blade 50 may include other features, for example and without limitation, a platform and/or a shroud. Blade 50 includes a plurality of openings 56, 58 and 60 that are disposed at and extend from the base 62 of attachment 54 into attachment 54, illustrated in a cutaway portion of attachment 54 in FIG. 2. In one form, openings 56, 58 and 60 are cored passages, which may include core support printouts, cooling air supply cored passages for providing cooling to airfoil 50 and/or cooling air discharge cored passages for discharging cooling air from airfoil 50. In other embodiments, one or more of openings 56, 58 and 60 may be machined openings and not core printouts. Disposed in openings 56, 58 and 60 are plugs 64, which are configured to be retained in openings 56, 58 and 60 by an interference fit without the use of a material joining process.

Figures 3A, 3B:
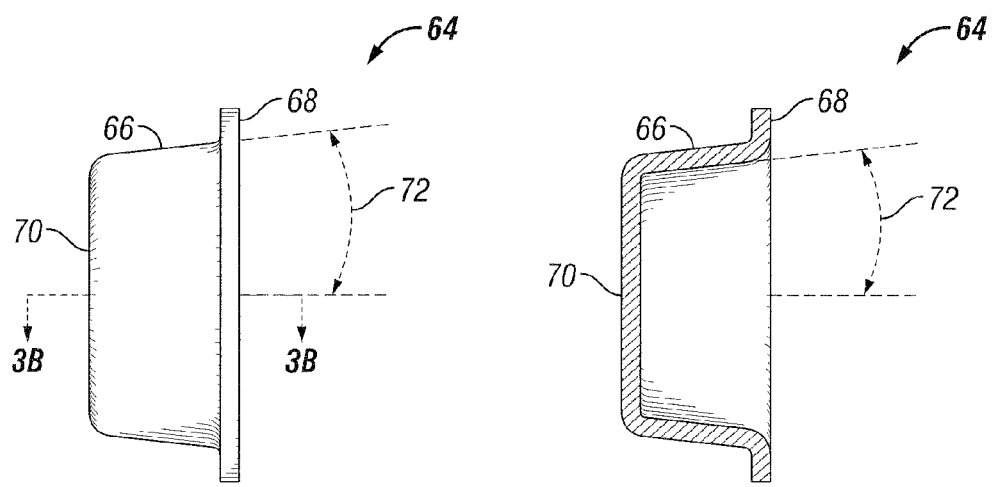
FIGS. 3A and 3B illustrate some aspects of a non-limiting example of a plug in accordance with an embodiment of the present invention.

Referring to FIGS. 3A and 3B, a non-limiting example of some aspects of plug 64 in accordance with an embodiment of the present invention is depicted. In one form, plug 64 includes a fitting surface 66, a flange 68 and a back plate 70. In other embodiments, plug 64 may not include one or both of flange 68 and back plate 70. Fitting surface 66 is configured for engagement with one or more of openings 56, 58 and 60 with the interference fit. In some embodiments, one or more of openings 56, 58 and 60 may be cored passages that have been machined adjacent to base 62 to enhance the fitment of plug 64. The size of fitting surface 66 may vary with the needs of the application and the size of the attachment opening, e.g., one or more of openings 56, 58 and 60, into which the particular plug 64 is to be installed. In one form, fitting surface 66 is non-cylindrical. In a particular form, fitting surface 66 is conical, defined by a cone angle 72. In other embodiments, fitting surface 66 may take other cylindrical or non-cylindrical forms.

Flange 68 is configured to prevent entry of the entirety of the plug 64 into the designated opening, e.g., one or more of openings 56, 58 and 60. Back plate 70 extends from fitting surface 66. In one form, back plate 70 is configured to prevent the flow of fluid, e.g., cooling air, into or out of attachment 54. In some embodiments, back plate 70 may include an opening configured to permit the flow of cooling air into or out of attachment 54. The opening may be a flow control orifice configured to meter or control the flow of cooling air into or out of attachment 54. In some embodiments not having a back plate 70, fitting surface 66 may culminate in an opening configured to permit the flow of cooling air into or out of attachment 54, which may or may not be configured as a flow control orifice to meter or control the flow of cooling air into or out of attachment 54.

Figure 4:
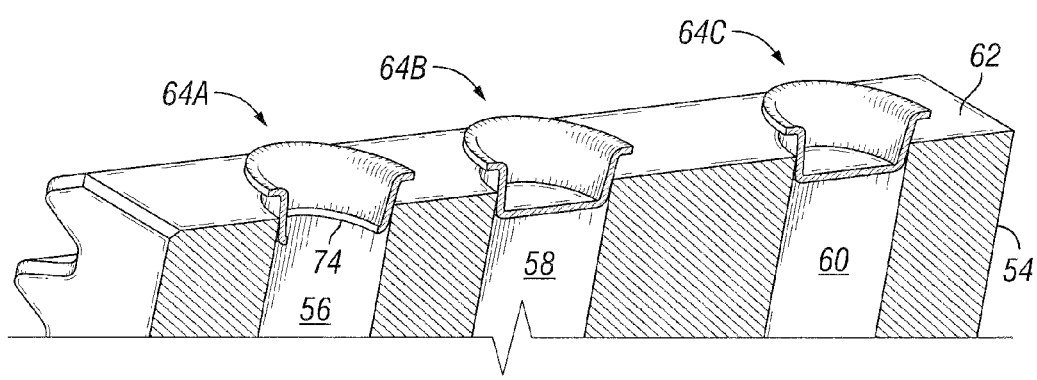
FIG. 4 is an inverted partial sectional perspective view of a non-limiting example of some aspects of a blade attachment and plugs in accordance with an embodiment of the present invention.

Referring to FIG. 4, three plugs 64A, 64B and 64C are illustrated as installed in base 62 of attachment 54 into respective openings 56, 58 and 60. Plug 64A includes an opening 74 in the form of a flow control orifice configured to meter or control the flow of cooling air into attachment 54. Plugs 64B and 64C include intact back plates 70 that prevent the flow of cooling air into or out of attachment 54 via respective openings 58 and 60. Upon installation of plugs 64A, 64B and 64C into respective openings 56, 58 and 60, the plugs are retained in the openings via the interference fit between fitting surface 66 of each of plugs 64A, 64B and 64C with respective openings 56, 58 and 60. During the operation of engine 10, the rotation of blades 50 induces centrifugal forces that enhances the retention of plugs 64A, 64B and 64C in attachment 54.

Embodiments of the present invention include a blade for a gas turbine engine, comprising: an airfoil; an attachment affixed to the airfoil and having an attachment opening therein; and a plug disposed in the attachment opening, wherein the plug is configured to be retained in the attachment opening by an interference fit without the use of a material joining process.

In a refinement, the plug has a fitting surface configured for engagement with the attachment opening with the interference fit; and wherein the fitting surface is non-cylindrical.

In another refinement, the fitting surface is conical.

In yet another refinement, the plug includes a back plate extending from the fitting surface.

In still another refinement, the back plate is configured to prevent a flow of fluid into or out of the attachment.

In yet still another refinement, the back plate includes a cooling air opening configured to permit a flow of cooling air into or out of the attachment.

In a further refinement, the cooling air opening is configured to control the flow of cooling air into or out of the attachment.

In a yet further refinement, the plug includes a flange configured to prevent entry of an entirety of the plug into the attachment opening.

In a still further refinement, the plug includes a cooling air opening configured to permit a flow of cooling air into or out of the attachment.

Embodiments of the present invention include a gas turbine engine, comprising: a compressor; a combustor in fluid communication with the compressor; a turbine in fluid communication with the combustor; and a blade configured for use as a compressor blade or a turbine blade, wherein the blade includes an airfoil; an attachment extending from the airfoil and having an attachment opening therein; and a plug disposed in the attachment opening, wherein the plug is configured to be retained in the attachment opening by an interference fit without the use of a material joining process.

In a refinement, the attachment opening is disposed at a base of the attachment.

In another refinement, the blade has a cored passage extending through the attachment; and wherein the attachment opening is part of the cored passage and/or formed in the cored passage.

In yet another refinement, the cored passage is a core support printout.

In still another refinement, the cored passage is a cooling air supply or discharge passage.

In yet still another refinement, the plug has a fitting surface configured for engagement with the attachment opening with the interference fit; and wherein the fitting surface is non-cylindrical.

In a further refinement, the fitting surface is conical.

In a yet further refinement, the plug includes a back plate extending from the fitting surface, wherein the back plate is configured to prevent a flow of fluid into or out of the attachment.

In a still further refinement, the plug includes a flange configured to prevent entry of an entirety of the plug into the attachment opening.

In a yet still further refinement, the plug includes a cooling air opening configured to permit a flow of cooling air into or out of the attachment.

Embodiments of the present invention include a gas turbine engine, comprising: a compressor; a combustor in fluid communication with the compressor; a turbine in fluid communication with the combustor; and a blade configured for use as a compressor blade or a turbine blade, wherein the blade includes an airfoil; an attachment extending from the airfoil and having an attachment opening therein; and means for controlling flow into or out of the attachment opening, wherein the means for controlling flow is configured to be retained in the attachment opening by an interference fit without the use of a material joining process.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A blade for a gas turbine engine, comprising:
    an airfoil;
    an attachment affixed to a root portion of the airfoil and having an attachment opening with a defined perimeter therein; and
    a plug having a longitudinal axis disposed in the attachment opening, a combination of interference fit and centrifugal force retaining the plug in a fixed position in the attachment opening during operation of the engine, wherein the plug is configured to be retained in the attachment opening by an interference fit without the use of a material joining process,
    a flange extending radially outward from the longitudinal axis at one end of the plug to overlap a portion of the attachment about the entire perimeter of the attachment opening, wherein the flange is substantially parallel to a face of the attachment where the opening is formed;
    a back plate extending across the plug at an opposing end opposite from the flange;
    wherein the plug includes a flow control orifice configured to meter the flow of cooling air into the attachment; and
    wherein the flow control orifice is defined by a through hole formed in the back plate.

2. The blade of claim 1, wherein the plug has a fitting surface configured for engagement with the attachment opening with the interference fit; and wherein the fitting surface is non-cylindrical.

3. The blade of claim 2, wherein the fitting surface is conical.

4. The blade of claim 2, wherein the plug includes a back plate extends from the fitting surface.

5. The blade of claim 1, further comprising:
    a second attachment opening formed in the attachment; and
    a second plug having a back plate configured to prevent a flow of fluid into or out of the attachment.

6. The blade of claim 1, wherein the flange is configured to prevent entry of an entirety of the plug into the attachment opening.

7. The blade of claim 1, further comprising:
another plug having a cooling air opening configured to permit a flow of cooling air out of the attachment.

8. A gas turbine engine, comprising:
a compressor;
a combustor in fluid communication with the compressor;
a turbine in fluid communication with the combustor; and
a blade configured for use as a compressor blade or a turbine blade, wherein the blade includes an airfoil; an attachment extending from a root portion of the airfoil and having an attachment opening with a defined perimeter shape therein; and a plug having a back plate on one end and a flange extending outward at the other end, the plug disposed in the attachment opening, a combination of interference fit and centrifugal force retaining the plug in a fixed position in the attachment opening during operation of the engine, wherein the plug is configured to be retained in the attachment opening by an interference fit without the use of a material joining process during engine operation, wherein the plug includes a flow control orifice defined in the back plate configured to meter the flow of cooling air into the attachment, and wherein the flange is substantially parallel to and overlaps a portion of the attachment about the entire perimeter of the opening to prevent entry of the entirety of the plug into the opening.

9. The gas turbine engine of claim 8, wherein the attachment opening is disposed at a base of the attachment.

10. The gas turbine engine of claim 8, wherein the blade has a cored passage extending through the attachment; and wherein the attachment opening is part of the cored passage and/or formed in the cored passage.

11. The gas turbine engine of claim 10, wherein the cored passage is a core support printout.

12. The gas turbine engine of claim 10, wherein the cored passage is a cooling air supply or discharge passage.

13. The blade of claim 8, wherein the plug has a fitting surface configured for engagement with the attachment opening with the interference fit; and wherein the fitting surface is non-cylindrical.

14. The blade of claim 13, wherein the fitting surface is conical.

15. The blade of claim 8, further comprising:
another plug having a back plate configured to prevent a flow of fluid into or out of the attachment.

16. The blade of claim 8, further comprising:
another plug having a cooling air opening configured to permit a flow of cooling air out of the attachment.

17. A gas turbine engine, comprising:
a compressor;
a combustor in fluid communication with the compressor;
a turbine in fluid communication with the combustor; and
a blade configured for use as a compressor blade or a turbine blade, wherein the blade includes an airfoil; an attachment extending from the airfoil and having an attachment opening therein; and
means for controlling flow into or out of the attachment opening, wherein the means for controlling flow is configured to be retained in the attachment opening by an interference fit without the use of a material joining process, and wherein the means for controlling includes a flow control orifice being in a non-movable configuration by a combination of interference fit and centrifugal force during engine operation, the flow control orifice being configured to meter the flow of cooling air into the attachment; and
a flange extending radially outward at one end of the means for controlling flow, wherein the flange is substantially parallel to and overlaps a portion of the attachment about an entire perimeter of the attachment opening to prevent entry of the entirety of the means for controlling flow from entering into the opening.

* * * * *